Sept. 25, 1956    H. KOHLER    2,764,064
OBJECTIVE LENS FOR FIELD GLASS
Filed Aug. 3, 1953
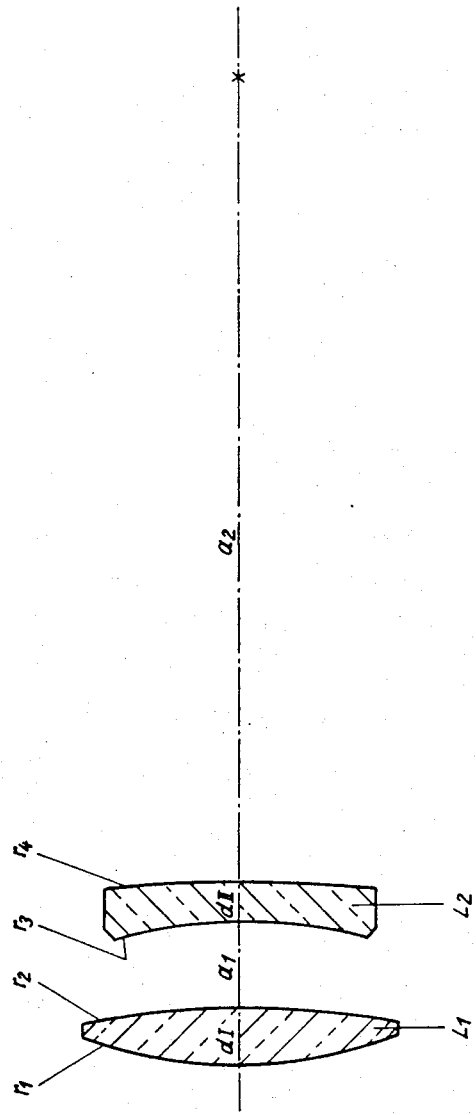

United States Patent Office 2,764,064
Patented Sept. 25, 1956

2,764,064

OBJECTIVE LENS FOR FIELD GLASS

Horst Köhler, Heidenheim (Brenz), Germany, assignor to Carl Zeiss, Heidenheim (Brenz), Germany Application August 3, 1953, Serial No. 371,765

Claims priority, application Germany August 9, 1952

2 Claims. (Cl. 88—57)

The hitherto customary field glasses are equipped, as is well known, with objectives which consist of a collective crown lens as front element and of a dispersive flint lens, cemented to it, as rear element. With these objective types the relative aperture in general is restricted to 1:4, in the utmost to 1:3.5, since otherwise no serviceable correction of the image defects is to be attained. The limitation of the relative aperture determines with a given optical performance (diameter of objective and magnification) a definite minimum over-all length.

For various reasons it is desirable to reduce the overall length. However, certain limits are set to this endeavor, which in the first place are determined by the demands on the correction of image errors. The present invention now has as its basis the task of decreasing this over-all length without impairing the correction. This signifies a great advantage, since field glasses with smaller over-all length are much more handy for the user, whereby reduction of the over-all length by a few millimeters already is important.

One could attain this aim of a shortening of the over-all length without impairment in the optical performance of field glasses through increase of the relative aperture, which however requires objectives of at least three elements, also with use of glass sorts with extremely high values of the refractive index. However such objectives are expensive and make the field glass relatively heavy.

There have also become known lens systems of the so-called telephoto type the focal distance of which being considerably greater than the image distance. These well-known systems consist of a positive front component and a negative rear component each component being composed of at least one positive and one negative lens element cemented together whereat a diaphragm is located in the air space separating these components. These well-known systems require a relatively large air space of about 15% of the focal length which especially for higher apertures as a consequence reduces the space for locating the Porro prisms between the rear element of said objective and the ocular lens. Also such constructions are more expensive and result in a heavy weight of the prism glass.

Object of the invention is an objective lens system of the telephoto type for prismatic telescopes and comprising two axially air separated components and consisting of a single positive front biconvex lens element and a rear negative meniscus shaped lens element having its concave side turned towards the positive front lens element, the focal length of the positive front lens element and the focal length of the rear negative meniscus lens element being so related that the two said lens elements are axially separated apart by an air space amounting at least to 3% and at most 10% of the focal length of the whole objective and the focal intercept of the focal point of the vertex of the rear lens element facing the image is at least 70% and at most 90% of the focal length of the whole objective, whereby the rear principal focal plane of the system is displaced forwards of the objective in the direction towards the object. In a preferred execution form in accordance with the invention, the field glass is equipped with objectives, whose dispersive rear element is a lens of a glass with a refractive index greater than 1.70. If necessary, front and rear element, in itself, can also be composed of cemented elements. Thus one can attain the relative aperture within the above stated limits, and the reduction of the over-all length takes place thereby, that in consequence of the air space the rear principal plane of the system is displaced forwards, hence in the direction towards the object.

In the figure of the accompanying illustration an objective for use in a field glass in accordance with the invention is represented as an exemplary execution form. The accompanying table contains the construction data as a computation example for a focal length of $f=100$ mm. with a focal intercept of the focal point of the vertex of the rear element facing the image of $a_2=78.6$ mm. In the following table are designated with $r_1 \ldots r_4$ the radii of curvature of the individual surfaces of the lenses $L_1, L_2$, of the objective counting from the front (the positive sign indicating that the surface is convex to the front and the negative sign that it is concave thereto). $d_I, d_{II}$ represent the axial thicknesses and $a_1$ the axial air separation between lenses $L_1$ and $L_2$. The table also gives the mean refractive indices for the D-lines, and the Abbe $\nu$ numbers of the materials of which the lens elements are made.

|  |  | $n_D$ | $\nu$ |
|---|---|---|---|
| $r_1=+\ 44.1$ | $d_I=5.66$ | 1.5163 | 64.0 |
| $r_2=-\ 71.3$ | $a_1=8.3$ |  |  |
| $r_3=-\ 48.8$ | $d_{II}=3.97$ | 1.7283 | 28.3 |
| $r_4=-149.5$ |  |  |  |

To be sure, it had already become known for the purpose of improving the correction of image errors in an objective of two elements for Galilean telescopes, to introduce an air space between the front and rear element of 0.1 to 1.5% of the focal length. Such a small air space however permits only a slight improvement of the image errors, but cannot serve for the aim of the invention, i. e. a noteworthy reduction in the over-all length of field glasses. The result of the invention namely sets in thereby, that in consequence of the air space the rear principal focal plane of the system is displaced forwards, hence in the direction towards the object.

I claim:

1. An objective lens system of the telephoto type for prismatic telescopes and comprising two axially air separated components and consisting of a single positive front biconvex lens element and a rear negative meniscus shaped lens element having its concave side turned towards the positive front lens element, the focal length of the positive front lens element and the focal length of the rear negative meniscus lens element being so related that the two said lens elements are axially separated apart by an air space amounting at least to 3% and at most 10% of the focal length of the whole objective and the focal intercept of the focal point of the vertex of the rear lens element facing the image is at least 70% and at most 90% of the focal length of the whole objective, whereby the rear principal focal plane of the system is displaced forwards of the objective in the direction towards the object.

2. An objective lens system of the telephoto type for prismatic telescopes and comprising two axially air separated components and consisting of a single positive front biconvex lens element and a rear negative meniscus shaped lens element having its concave side turned towards the positive front lens element, in said positive front lens element the radius of the front surface having a value between $.35 \cdot f$ and $.55 \cdot f$ and the radius of its rear surface having a value between $.65 \cdot f$ and $.85 \cdot f$, in said rear negative lens element the radius of the surface directed towards said front lens element having an absolute value between $.4 \cdot f$ and $.6 \cdot f$, $f$ being the focal length of the whole objective, the focal length of the positive front lens element and the focal length of the rear negative meniscus lens element being so related that the two said lens elements are axially separated apart by an air space amounting at least to 3% and at most 10% of the focal length of the whole objective and the focal intercept of the focal point of the vertex of the rear lens element facing the image is at least 70% and at most 90% of the focal length of the whole objective, whereby the rear principal focal plane of the system is displaced forwards of the objective in the direction towards the object.

References Cited in the file of this patent

UNITED STATES PATENTS

| | | |
|---|---|---|
| 415,040 | Hastings | Nov. 12, 1889 |
| 2,437,505 | Cox | Mar. 9, 1948 |
| 2,453,218 | Grey | Nov. 9, 1948 |

FOREIGN PATENTS

| | | |
|---|---|---|
| 15,732 | Great Britain | of 1905 |
| 189,255 | Germany | Sept. 30, 1907 |
| 198,592 | Great Britain | June 7, 1923 |
| 116,659 | Australia | Mar. 2, 1943 |
| 1,081,732 | France | June 9, 1954 |